United States Patent
Lustgarten

(10) Patent No.: US 9,428,668 B2
(45) Date of Patent: Aug. 30, 2016

(54) HYDROPHILIC POLYMER COMPOSITION AND METHOD OF FORMING A HYDROPHILIC POLYCAPROLACTONE

(71) Applicant: Stewart J. Lustgarten, Bellingham, MA (US)

(72) Inventor: Stewart J. Lustgarten, Bellingham, MA (US)

( * ) Notice: Subject to any disclaimer, the term of this patent is extended or adjusted under 35 U.S.C. 154(b) by 0 days.

(21) Appl. No.: 14/211,841

(22) Filed: Mar. 14, 2014

(65) Prior Publication Data

US 2016/0040032 A1    Feb. 11, 2016

Related U.S. Application Data

(60) Provisional application No. 61/793,189, filed on Mar. 15, 2013.

(51) Int. Cl.
| | | |
|---|---|---|
| C08F 2/46 | (2006.01) |
| C08F 2/50 | (2006.01) |
| C08G 61/04 | (2006.01) |
| C09D 167/04 | (2006.01) |

(52) U.S. Cl.
CPC .................................. *C09D 167/04* (2013.01)

(58) Field of Classification Search
CPC .................................................... C09D 167/04

USPC ...................... 522/6, 71, 189, 184, 1; 520/1
See application file for complete search history.

(56) References Cited

U.S. PATENT DOCUMENTS

| | | | | |
|---|---|---|---|---|
| 8,809,411 B2 * | 8/2014 | Rooijmans | ............. | A61L 29/08 |
| | | | | 520/1 |
| 2014/0147647 A1 * | 5/2014 | Nair | ......................... | C08J 9/28 |
| | | | | 428/220 |

* cited by examiner

*Primary Examiner* — Ling Choi
*Assistant Examiner* — Jessica E Whiteley

(57) ABSTRACT

A hydrophilic cross-linked ionic polycaprolactone polymer composition formed by the process of subjecting hydrophobic caprolactone or a hydrophobic caprolactone monomer to a source of ionizing radiation selected from the group consisting of an Electron Acceleration (E beam), Gamma II, Cobolt, X-ray or a source of UV radiation to form an ionic cross linked polycaprolactone polymer consisting of a soluble component part and an insoluble component part in a gel fraction % of soluble to insoluble parts, adjusting the duration of ionizing radiation and/or the intensity of the radiation until the concentration of the soluble component part is above at least about 65% by weight of the cross linked polymer wherein the cross linked polycaprolactone polymer is converted from a hydrophobic to a hydrophilic state. A coating of the hydrophobic polycaprolactone when in contact with water forms a boundary layer with very low contact angle.

8 Claims, No Drawings

HYDROPHILIC POLYMER COMPOSITION AND METHOD OF FORMING A HYDROPHILIC POLYCAPROLACTONE

This application claims the benefit of U.S. Provisional Application Ser. No. 61/793,189 filed on Mar. 15, 2013.

FIELD OF INVENTION

This invention is directed to a hydrophilic polymer composition and method of forming a hydrophillic polycaprolactone.

BACKGROUND OF THE INVENTION

Polycaprolactone ("PCL") is a polyester prepared by ring polymerization of an ∈-caprolactone monomer using a catalyst. Conventional polycaprolactone, as currently available, is hydrophobic. A solid hydrophobic surface causes turbulence at the interface between the solid surface and water. If the solid surface is the exterior surface of a vessel or other navigational medium and is composed of a hydrophobic material composition which is conventional to almost all navigational vessels, the surface composition will experience turbulence when moving in water. This is a direct result of its hydrophobicity which reduces the hydrodynamic efficiency of the vessel in water. Further hydrodynamic loss occurs from fouling caused by both hard and soft marine life species which attach to the hull of the vessel or settle on its surface and/or from the biofilm residue of different marine species in the presence of turbulent water.

SUMMARY OF THE INVENTION

It has been discovered in accordance with the present invention that hydrophobic polycaprolactone and an ∈-caprolactone monomer will become hydrophilic by subjecting the hydrophobic polycaprolactone and/or a hydrophobic caprolactone monomer to ionizing radiation to cross link the monomer into a solid polymeric hydrophilic polycaprolactone composition consisting of two distinct phases one of which is soluble and the other non-soluble provided the duration of ionizing radiation and/or the intensity of the radiation is varied until the soluble phase represents at least about 65% by weight of the irradiated composition and preferably above 68% by weight. Appropriate exposure to ionizing radiation will result using any conventional source of ionizing irradiation, including, Electron Acceleration (E-Beam), Gamma II, Cobalt, X-ray and/or by exposure to UV irradiation and its ionizing photons.

A hydrophilic liquid composition is formed from the solid polymeric polycaprolactone composition by immersing the solid hydrophilic polycaprolactone into a solvent immisible in the soluble phase with the solvent selected from the group consisting of Methyl Ethyl Ketone (MEK), Ethyl Acetate, Tetrahydra Furan and Tricloromethane for dissolving the soluble phase. The solvent may represent at least about 85% by weight of the dissolved composition for use in coating vessels to improve hydrodynamics.

The hydrophilicity of the polycaprolactone composition is visually apparent by spreading a liquid such as water over the surface of a substrate coated with the polycaprolactone composition after being immersed in the solvent. If the water spreads without the formation of droplets and has a low contact angle it is considered hydrophilic to those skilled in the art.

DESCRIPTION OF THE INVENTION

All conventional vessel hull materials are hydrophobic and exhibit a high contact angle with water or seawater which creates turbulent flow over the hull's surface reducing the hydrodynamics of the vessel. A slippage-free, anti-fouling surface is formed using a hydrophilic polycaprolactone coating or with the surface of the vessel formed from hydrophilic polycaprolactone which improves the hydrodynamic efficiency and speed of any vessel coated or formed from hydrophilic polycaprolactone. A coating of hydrophilic polycaprolactone may easily be applied to any conventional surface such as, for example, Fiberglass, Urethane, Carbon Fiber, Epoxy, Wood, Aluminum, Steel, Hypalon, Lead, PVC and concrete and hydrophilic polycaprolactone will adhere to all bottom paint surfaces without the need for scrapping off other than for blisters or loose and lifting edges.

Applicant has discovered that hydrophobic caprolactone ("PCL") is convertible into hydrophilic polycaprolactone ("PCL") by subjecting the hydrophobic caprolactone to ionizing radiation. A hydrophobic ∈ caprolactone monomer having a molecular weight, between 25,000 and 75,000 and a melting point above 60° C. when subjected to ionizing irradiation will cross link into a solid polymer consisting of two distinct phases one of which is soluble and the other non-soluble. By varying the duration of ionizing radiation and/or the intensity of the radiation until the soluble phase is at a concentration above at least about 65% by weight of the cured composition and preferably above 68% by weight the hydrophobic caprolactone is converted into hydrophilic polycaprolactone.

A coating composition may be formed from the solid hydrophilic polycaprolactone by dissolving the hydrophilic polycaprolactone into a solvent which is immisible in the soluble phase and preferably selected from the group consisting of Methyl Ethyl Ketone (MEK), Ethyl Acetate, Tetrahydra Furan and Tricloromethane for dissolving the soluble phase thereby forming a liquid coating composition of hydrophilic polycaprolactone. The coating composition may also include polyvinyl acetate and/or polyethylene. The solvent should represent at least about 50% and preferably 85% by weight of the coating composition. Where hydrostatic conditions exist, an effective non-biocidal agent such as, Zinc oxide and/or Calcium hydroxide may also be included in the hydrophilic polycaprolactone composition of the present invention as an effective adjunct to inhibit hard and/or soft marine growth or film and/or, a Vinyl silane coated halide salt, such as Ammonium chloride may be included to provide an electrophoretic effect throughout the hydrophilic PCL polymer composition resulting in an antimicrobial surface as well which will provide a highly positive polarity throughout, the coating with a pH which has been shown to approach upwards of pH 14.

By using the hydrophilic PCL polymer composition of the present invention a durable long lasting thin film coating is formed for the first time, on the hull surface of a vessel which exhibits non-turbulent hydrodynamics and provides for laminar flow over a boundary layer. The composition of the present invention can be easily painted on the water bearing surfaces of surf boards, water skis, water boards, body boards, kayaks, canoes, small sailboats, sculls, row boats, etc.

One object of this invention is to cover the exposed surface of a vessel with the hydrophilic "XL-PCL" polymer composition of the present invention having a low contact angle to provide a non-turbulent, laminar flow for improving vessel hydrodynamics and to inhibit the fouling of the immersed vessel surface by hard marine life and which also causes the friction of cavitation. The vessel surface in contact with water may be covered using a coating of the hydrophilic "XL-PCL" polymer composition of the present invention or affixing panels of the hydrophilic XL-PCL polymer composition of the present invention to the vessel surface.

Studies of fluid mechanics show that without Reynolds numbers, a smooth laminar axial flow of a fluid is established over a perpendicularly bound, boundary layer of similar or made compatible by forming emulsions of fluid such as water causing this boundary layer to be formed to now have a hydrophilic surface, having a low contact angle resulting in greater hydrodynamics as opposed to a conventional hydrophobic vessel surface with a high contact angle and providing adverse, turbulent flow. Moreover, there is no slippage (friction) over a hydrophilic surface as compared to a hydrophobic surface which causes slippage (friction). Marine studies have also shown that the cyprid larvae stage of barnacles and others resist settling down and attaching themselves to a less preferable, laminar flow surface.

The present invention results in dual functioning hydrodynamic improvements which are unique to this invention. Current Anti-Fouling paints can only preventing fouling by hard marine life but are biocidal and are ecological unfriendly. Conventional, heavy metals ablative coatings all possesses high contact angle at the interface with water and cause turbulent flow over the hull's surface, pilings and buoys. The hydrophilic "XL-PCL" polymer composition of the present invention may be applied to all submerged hull surfaces to reduce friction (drag) resulting currently from cavitation or turbulent flow over the conventional hydrophobic surface.

The slippage-free, anti-fouling hydrophilic "XL-PCL" polymer composition of the present invention improves the hydrodynamic efficiency and speed of any vessel and is easily applied to any conventional surface of, for example, Fiberglass, Urethane, Carbon Fiber, Epoxy, Wood, Aluminum, Steel, Hypalon, Lead, PVC and concrete hull surfaces and will adhere to all bottom paint surfaces without the need for scrapping off other than for blisters or loose and lifting edges. All conventional vessel surfaces cause turbulent flow and exhibit slippage.

Where hydrostatic conditions exist, an effective non-biocidal agent such as Zinc Oxide and/or Calcium Hydroxide may be included in the hydrophilic XL-PCL polymer composition of the present invention as an effective adjunct to inhibit hard and/or soft marine growth or film and/or, a Vinyl silane coated halide salt, such as Ammonium chloride may be included to provide an electrophoretic effect throughout the hydrophilic PCL polymer composition resulting in an anti-microbial surface as well which will provide a highly positive polarity throughout, the coating with a pH which has been shown to approach upwards of pH 14.

By using the hydrophilic, "XL-PCL" polymer composition of the present invention, a durable long lasting thin film coating is formed for the first time, on the hull surface of a vessel which exhibits non-turbulent hydrodynamics and provides for laminar flow over a boundary layer. The composition of the present invention can be easily painted on the water bearing surfaces of surf boards, water skis, water boards, body boards, kayaks, canoes, small sailboats, sculls, row boats, etc.

The hydrophilic "XL-PCL" polymer composition of the present invention may be applied or used to form a molding and/or coating which has no water surface contact angle, promotes hydrogen bonding on its surface, develops a boundary layer at the interface with water and air to promote frictionless laminar flow over the boundary layer. It is a further advantage of this invention using the hydrophilic "XL-PCL" polymer composition to maximize hydro or aero dynamics, minimize Reynolds" numbers of Fluid Mechanics, and to provide a frictionless substrate surface. Moreover, the present invention also provides for an anti-fouling coating, film or panel formed from the hydrophilic PCL polymer composition which may be applied or affixed below the waterline hull surface of a vessel to inhibit fouling by hard marine invertebrate life and which is also reasonably biodegradable, beyond its intended useful life as well as other uses as described below.

An example polymer thermoplastic composition for use in this invention before irradiation may have any Molecular Weight between 3,000 by GPC to 250,000 by GPC of uncross-linked Polycaprolactone "PCL" such as (CAS No. 24980-4) having a melting temperature of approximately 165 degrees F. in any solid form including small particle beaded pellet fractionized form, cut-up form, film or in the form of a sheet, rod, or an extruded panel, with the preferred molecular weight of 50,000 by GPC.

Regardless of which form of the un-crosslinked "PCL" is selected, it is then subjected to appropriate exposure to ionizing irradiation, including Electron Acceleration (E-Beam), Gamma II, Cobalt, X-ray and natural or unnatural exposure to UV ray irradiating and its ionizing photons. The application of sufficient irradiation to cross-link the "PCL" results in two distinctly different phases including a soluble and an insoluble phase which occurs in the cross-linked "PCL" (hereinafter "XL-PCL") as a result of the irradiation as explained heretofore. The soluble phase will be solubilized in any appropriate solvent such as Methyl Ethyl Ketone (MEK) or, Ethyl Acetate and the insoluble gel-like phase will not. The amount of irradiation of the above mentioned forms of ionizing irradiation determines the amount of each phase formed. The two phases may be separated from one another during solubilization of the "XL-PCL" as is also described in U.S. Pat. No. 5,977,203.

While the insoluble phase is under 37%, the "XL-PCL" polymer becomes hydrophilic. Moreover, it has also been determined that once the "XL-PCL" solubilizes and the insoluble phase is separated or filtered out from the dissolved solution of the PCL in solvent and the solvent heated to volatilize away and the XL-PCL gel-like phase becomes completely dry it returns into a solid hydrophobic polymer having a high melting temperature. On the other hand, when the XL-PCL soluble phase is allowed to fully dry, it exhibits the same much lower melting temperature and is hydrophilic. The surface of the dry XL-PCL soluble phase will form a boundary layer when immersed into water at the interface with the water or air. The dry XL-PCL soluble phase PCL polymer constitutes "Composition "A") in the following examples.

Accordingly, the preferred method of the present invention for coating a vessel with a hydrophilic "XL-PCL" composition is to provide a me to-solubilize the irradiated "XL-PCL" polymer in any form and regardless of the amount of insoluble gel-like phase contained within the "XL-PCL" in a solvent, such as MEK, raise its bath temperature using a pressurized sealed vessel or container to 170-175 degrees F. which is below the boiling point of MEK, reported to be 179 degrees F. but above the melting temperate of the "XL-PCL" of 165 degrees F. and to allow the "XL-PCL" to melt using appropriate agitation such as by mixing, shaking and stirring. Thereafter, the two distinctly different phases of "XL-PCL" are separated out of the solution by decanting or filtering and the insoluble gel-phase easily strained away leaving a hydrophilic PCL in solution with the solvent MEK. The solvent MEK-serves as a vehicle for applying a coating in the form of a paint to any vessel's hull surface. Once the solvent volatiles away from the vessel surface it, deposits a hydrophilic "XL-PCL" coating onto whatever surface of the vessel it is applied to.

The insoluble gel-like "XL-PCL" phase may then be safely discarded or used for a different thermoplastic "XL-PCL" and which requires moldability or formability when heated, hydrophobicity, condensability, high heat resistance, minimal polymer shrinkage, high resistance to permanent deformation, high resistance to elongation, high resistance to indentation and where various inorganic and organic modifiers may be easily incorporated to provide other features and benefits to this remaining thermoplastic, "XL-PCL", insoluble polymer. One such product, as described above, resides in a root canal filing material, for teeth.

However, it should be understood that the hydrophilic PCL polymer composition of this invention can be used either in solubilized form or as a solid for the fabrication of the hull outer surface or as a coating to form a bottom paint for all size and types of vessels of any size including an Aircraft Carrier or for a small size vessel such as a surfboard either as a paint or attached in panels. The hydrophilic PCL polymer of this invention may be used as an injection molding material for medical device use such as in the fabrication of catheters and an assortment of stents or wherever else a hydrophilic injection molding material with a hydrophilic surface is preferred such as for hand fabrication of Intra-Oral Use for the fabrication of Crowns, Bridges and Inlays and Denture and Partial Denture base materials and also for their polymeric posterior, false teeth. The hydrophilic PCL polymer of this invention may be used as a coating to significantly improve the glide of a razor over one's face, under arms, legs or wherever, for a closer, smoother, safer and faster shave. once applied to the plastic cartridge of the blade and blade and allowed to dry for less than five minutes.

Paint & Coating Compositions

As the preferred diluent and vehicle to the polymer composition for its safety and higher boiling point of, 175 degrees F. is Methyl Ethyl Ketone (MEK) (CAS No. 78-93-3). Ethyl Acetate (CAS No. 141-78-6) and/or Tetrahydra Furan (CAS No. 109-99-9) and Tricloromethane (CAS No. 67-66-3) can also be used but have lower boiling points or are less safe than Methyl Ethyl Ketone.

Example I

For High Hydrodynamic Performance

<5 Micron Film Thickness to ⅛" (By Weight)

For: Surf Boards, Kayaks, Water Boards, Small Sailing Craft, Wind Surf Boards, etc.
Spray On Paint—For High Performance Competition Sailboats, Surfboards, Sculling, Rowing, Water Skiing, etc.

| (A) | 0.5 parts | Composition "A" |
| (B) | 99.5 parts | MEK* Diluent and Vehicle |
| (C) | Trace | Powdered Pigment |

*Note To "Example-I
Acetone, Xylene and Toulene may be added as a vehicle to promote improved bonding of the paint to the substrate. Also up to 15% by weight of Polyvinyl acetate or a co-polymer of Polyvinyl Acetate and Polymethyl methacrylate may be added from 1% to 15% with the preferred being 10%, to provide for greater durability and more tenacious bonding to the substrate.

Preparation of Coatings and Paints

In a tightly closed glass jar, place and dissolve "XL-PCL into "B" and color pigment and heat in a water bath to <170 degree F. or until "A" turns clear. Then pour into a suitable High Density Polyethylene container and beat mix with a Proctor/Silux 100 Watt beater for 30 minutes on low setting or until all clear polymer lumps appear to disappear and an even syrup-like consistency is formed.

Example II

For Hydrodynamic Performance and Anti-Fouling

For: Surf Boards, Kayaks, Water Boards, Small Sailing Craft, Wind Surf Boards, etc.
Spray-On

| (A) | 0.8 parts | Composition "A" |
| (B) | 90.2 parts | MEK* Diluent and/or Vehicle |
| (C) | 5 parts | Zinc oxide, a safe environmentally friendly biocidal agent |
| (D) | 4 parts | Iron Oxide, Titanium dioxide or Ultra Marine Blue as pigments |

*Note To Example-II'
Acetone, Xylene and Toulene may be added as a vehicle to promote improved bonding of the paint to the substrate. Also Polyvinyl Acetate and/or Polyvinyl Alcohol or a co-polymer of Polyvinyl Acetate and Polymethyl methacrylate may be added from 1% to 15% with the preferred being 10%, to provide for greater durability and more tenacious bonding to the substrate. Composition "B" Also up to 15% by weight of Polyvinyl acetate and/or Polyvinyl Alcohom mixture may be added with the preferred being 10% to provide for greater durability and more tenacious bonding to the substrate.

Example III

For Maximum Laminar Flow and Hard Fouling Inhibition

Where hull fouling is by both hard and soft marine life in hydrostatic conditions, 5% of the preferred non-biocide and environmentally friendly Zinc oxide (ZnO) (CAS No. 1314-13-2) can be added to Composition-B. Also which may be added in a suitable amount for these conditions is Zinc pyrithione (CAS No. 13463-41-7), Copper compounds such a Cuprous oxide (CAS No. 1317-39-1) and/or Lead and its compounds or any other suitable heavy metal or biocide. For extreme conditions, not <then 1% to no >then 3.5% of a non-leaching electrophoretic biocide of Vinyl silane coated quaternary Ammonium chloride halide salt particles are also added. This biocide composition is taught in U.S. Pat. No. 7,858,141.

Example IV

For High Hydrodynamic Performance

<5 Micron Film Thickness to ⅛" (By Weight)

For: Surf Boards, Kayaks, Water Boards, Small Sailing Craft, Wind Surf Boards, etc.

Example V

Spray On Paint—For High Performance Competition

Sailboats, Surfboards, Sculling, Rowing, Water Skiing, etc.

| (A) | 0.5 parts | Composition A, in particulate form |
| --- | --- | --- |
| (B) | 99.5 parts | MEK* Diluent and Vehicle |
| (C) | Trace | Powdered Pigment |

*Note To "A"
Acetone, Xylene and Toulene may be added as a vehicle to promote improved bonding of the paint to the substrate. Also up to 15% by weight of Polyinyl Alcohol,, Polyvinyl acetate and/or combinations of both and/or together with or a co-polymer of, Polyvinyl Acetate and Polymethyl methacrylate may be added from 1% to 15%, with the preferred being, 10% by weight, to provide for greater durability and more tenacious bonding to the substrate.

Preparation of Coatings and Paints

In a tightly closed glass jar, place and dissolve "XL-PCL into "B" and color pigment and heat in a water bath to <170 degree F. or until "A" turns clear. Then pour into a suitable High Density Polyethylene container and beat mix with a Proctor/Silux 100 Watt beater for 30 minutes on low setting or until all clear polymer lumps appear to disappear and an even syrup-like consistency is formed.

Example VI

For Hydrodynamic Performance and Anti-Fouling

For: Surf Boards, Kayaks, Water Boards, Small Sailing Craft, Wind Surf Boards, etc.
Spray-On Composition Comprising

| (E) | 0.8 parts | hydrophilic PCL polymer in particulate form or as a gel |
| --- | --- | --- |
| (F) | 90.2 parts | MEK* Diluent and/or Vehicle |
| | 5.0 parts | Zinc oxide, a safe environmentally friendly biocidal agent |
| (G) | 4.0 parts | Iron Oxide, Titanium dioxide or Ultra Marine Blue as pigments |

*Note That
Acetone, Xylene and Toulene may be added as a vehicle to promote improved bonding of the paint to the substrate. Also Polyvinyl Acetate and/or Polyvinyl Alcohol or a co-polymer of Polyvinyl Acetate and Polymethyl methacrylate may be added from 1% to 15% with the preferred being 10%, to provide for greater durability and more tenacious bonding to the substrate. In addition to the hydrophilic PCL polymer in particulate form or as a gel you may add up to 15% by weight Polyvinyl acetate and/or Polyvinyl Alcohol with 10% being preferred to provide for greater durability and more tenacious bonding to the substrate.

Example VII

For Brush or Roll-On Durable Paint Composition Comprising for Hulls, Buoys, Pilings, Etc.

For greater Film Thickness

| (A) | 7.54 parts | Composition A |
| --- | --- | --- |
| (B) | 92.2 parts | MEK* Diluent and Vehicle |
| "C" | 0.4 parts. | Fumed Colloidal Silica (Cab-o-Sil) (CAS No. 112945-52-2) |

*Note
Acetone, Xylene and Toulene may be added as a vehicle to promote improved bonding of the paint composition to the substrate. Polyvinyl Acetate or a co-polymer of Polyvinyl Acetate and Polymethylmethacrylate may be added from 1% to 15% with the preferred being 10%, to provide for greater durability and more tenacious bonding to the substrate.

Prepare in same manner as above but adding all 3 ingredients.

The Brush-On composition as described above is fast drying and can be painted on in layers to a desirable thickness. Each layer has approx. a 1/64" film thickness to an outside range limit of 3/16".

Example VIII

Foil, Tiles, Panels

Blown film and extruded or calendared tiles and panel sheets can be made from the hydrophilic Polymer composition for large size vessels. They can be mechanically or adhesively affixed to the below water line hull surface during dry dock manufacture or when in dry dock. Tiles and Panel sheets of 1/32" to 5/16" thick are preferred for this purpose. 5% Zinc oxide may be added to the mixture during compounding of the Composition. An added feature during application of films, tiles and panels is that the Composition has a glass transition temperature (gT) of 165 F and the film, tiles and panels can be custom contoured and fitted to the substrate hull's surface during application with a heat blow gun and easily welded together to become impervious to the hull. Oxidation and electrolytic corrosion inhibitors can also be added.

The above compositions can also be made into fabric for swimwear and/or laminated film for diving wear to improve hydrodynamics, when swimming. From panels of the composition, entire below waterline hulls can be molded by such methods as thermoforming or other forms of molding thermoplastic materials, Coatings for Razor Blade cartridges, Coating for Molded Catheters &, Stints and where there thermoplastic surfaces are hydrophobic, And also thermoplastic polymer moldable material for the moldable fabrication of Dental Crowns, Bridges, Posterior Denture Teeth and Pink Denture Base Material and where the polymer material is hydrophobic and where it is known that hydrophilicity is a desirable denture retention property for the tissue bearing surface of the Denture, by either molding the denture base material from the Thermoplastic hydrophilic material of this invention in now conventional ways or by coating its tissue bearing surface of denture base materials and where the polymer material is hydrophobic for this significant retentive surface.

In all areas of fluid mechanics and where laminar flow is desirable this invention can lend itself. This, mainly in the areas of hydraulics, as a composition or coating for pumps, tubing and pipe and in the area of aerodynamics for providing, laminar flow over airfoils and fuselage of aircraft and to inhibit wing icing. The very nature of the composition lends itself as a very lightweight and thin film thickness paint providing a suitable water boundary layer for the under bellies of Aircraft fuselages, empennages, wings and engine nacelles to provide for smoother emergency water landings with less turbulent fatigue on the aircraft's skin and superstructure or can be firmly attached to the undersides as panels or films to very large vessels.

What is claimed is:

1. A hydrophilic cross-linked ionic polycaprolactone polymer composition formed by the process of subjecting hydrophobic caprolactone or a hydrophobic caprolactone monomer to a source of ionizing radiation selected from the group consisting of an Electron Acceleration (E beam), Gamma II, Cobolt, X-ray or a source of UV radiation to cross link the hydrophobic caprolactone monomer or hydrophobic caprolactone into an ionic cross linked polycaprolactone polymer consisting of a soluble component part and an insoluble component part in a gel fraction % of soluble to insoluble parts, adjusting the duration of ionizing radiation and/or the intensity of the radiation until the concentration of the soluble component part is above at least about 65% by weight of the cross linked polymer wherein the cross linked polycaprolactone polymer is converted from hydrophobic polycprolactone to an ionic hydrophilic polycaprolactone and wherein the soluble component part is soluble in a solvent selected from the group consisting of methyl ethyl ketone ("MEK"), ethyl acetate, tetetrahydrafuran and trichloromethane.

2. A hydrophilic cross-linked ionic polycaprolactone polymer composition as defined in claim 1 further comprising a bonding agent for bonding the hydrophilic polymer composition to a substrate with the bonding agent selected from the group consisting of acetone, xylene and toluene.

3. A cross-linked ionic polycaprolactone hydrophilic polymer composition as defined in claim 2 wherein the bonding agent further comprises polyvinyl acetate and/or polyvinyl alcohol.

4. A method of forming an ionic hydrophilic polycaprolactone comprising the steps of subjecting hydrophobic polycaprolactone or a hydrophobic caprolactone monomer to a source of ionizing radiation selected from the group consisting of an Electron Acceleration (E beam), Gamma II, Cobolt, X-ray or a source of UV radiation of an intensity sufficient to crosslink the hydrophobic caprolactone monomer or hydrophobic caprolactone for forming an ionic cross linked polycaprolactone polymeric composition consisting of a soluble component part and an insoluble component part in a gel fraction % of soluble to insoluble parts, adjusting the duration of ionizing radiation and/or the intensity of the radiation until the concentration of the soluble component part is above at least about 65% by weight of the cross linked polymer wherein the cross linked polycaprolactone polymer is converted from hydrophobic polycprolactone to hydrophilic polycaprolactone and wherein the soluble component part is soluble in a solvent selected from the group consisting of methyl ethyl ketone ("MEK"), ethyl acetate, tetetrahydrafuran and trichloromethane.

5. A method as defined in claim 4 further comprising the steps of adding said solvent to the cross linked ionic polycaprolactone polymeric composition for dissolving the soluble phase and filtering out the non-soluble phase to form a liquid solution composed of the dissolved soluble phase.

6. A method as defined in claim 5 further comprising the step of drying the ionic cross linked solubilized phase into a dry material composition.

7. A method as defined in claim 6 further comprising adding a diluent and/or vehicle to the dry ionic hydrophilic polycaprolactone composition to form a liquid coating composition for use in coating a vessel to improve its hydrodynamic performance in water.

8. A method as defined in claim 6 further comprising adding a diluent and/or vehicle to the dry ionic hydrophilic polycaprolactone composition, heating the mixture in water and adding polyethylene to form a paint.

\* \* \* \* \*